(12) United States Patent
Cheng

(10) Patent No.: US 10,536,566 B1
(45) Date of Patent: Jan. 14, 2020

(54) FOLDABLE ELECTRONIC APPARATUS AND METHOD FOR CONTROLLING FOLDABLE ELECTRONIC APPARATUS

(71) Applicant: Guangdong Oppo Mobile Telecommunications Corp., Ltd., Dongguan, Guangdong (CN)

(72) Inventor: Jiao Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/509,439

(22) Filed: Jul. 11, 2019

(30) Foreign Application Priority Data

Jul. 13, 2018 (CN) .......................... 2018 1 0776032

(51) Int. Cl.
*H04M 1/02* (2006.01)
*H04M 1/03* (2006.01)
(Continued)

(52) U.S. Cl.
CPC ....... *H04M 1/0243* (2013.01); *H04M 1/0268* (2013.01); *H04M 1/03* (2013.01);
(Continued)

(58) Field of Classification Search
CPC ............. H04M 1/0268; H04M 1/0216; H04M 1/0214; H04M 1/022; H04M 1/02;
(Continued)

(56) References Cited

U.S. PATENT DOCUMENTS

| 2007/0087793 | A1 | 4/2007 | Noma et al. |
| 2018/0085544 | A1* | 3/2018 | Holyoake ............. A61M 16/06 |
| 2019/0018454 | A1 | 1/2019 | Jung et al. |

FOREIGN PATENT DOCUMENTS

| CN | 1659851 A | 8/2005 |
| CN | 101009490 A | 8/2007 |

(Continued)

OTHER PUBLICATIONS

International search report issued in corresponding international application No. PCT/CN2019/093845 dated Oct. 9, 2019.
(Continued)

*Primary Examiner* — Diane D Mizrahi
(74) *Attorney, Agent, or Firm* — Young Basile Hanlon & MacFarlane, P.C.

(57) ABSTRACT

A foldable electronic apparatus and a method for controlling the foldable electronic apparatus are provided. The foldable electronic apparatus includes a casing assembly and a flexible display assembly disposed at the casing assembly. The casing assembly includes a first body and a second body. The first body is rotatable relative to the second body to switch the foldable electronic apparatus between a folded state and an unfolded state. The foldable electronic apparatus further defines a first acoustic opening in a second surface of the first body opposite a first surface of the first body, and a second acoustic opening in a side of the foldable electronic apparatus where an inner folding surface thereof is located. The foldable electronic apparatus emits sounds through the first acoustic opening or the second acoustic opening according to the states of the foldable electronic apparatus.

20 Claims, 17 Drawing Sheets

(51) Int. Cl.
*H04M 1/725* (2006.01)
*H04R 1/02* (2006.01)

(52) U.S. Cl.
CPC ......... *H04M 1/72569* (2013.01); *H04R 1/028* (2013.01); *H04R 2499/15* (2013.01)

(58) Field of Classification Search
CPC ............. H04M 1/0206; H04M 1/0218; H04M 1/0247; H04M 1/0249; H04M 1/0266
See application file for complete search history.

(56) References Cited

FOREIGN PATENT DOCUMENTS

| | | |
|---|---|---|
| CN | 101076043 A | 11/2007 |
| CN | 103167070 A | 6/2013 |
| CN | 105549682 A | 5/2016 |
| KR | 20170086321 A | 7/2017 |
| WO | 2014175455 A1 | 10/2014 |

OTHER PUBLICATIONS

Extended European search report issued in corresponding European application No. 19183892.9 dated Aug. 21, 2019.

\* cited by examiner

FOLDABLE ELECTRONIC APPARATUS AND METHOD FOR CONTROLLING FOLDABLE ELECTRONIC APPARATUS

CROSS-REFERENCE TO RELATED APPLICATION(S)

This application claims priority to Chinese Patent Application No. 201810776032.9, filed on Jul. 13, 2018, the entire disclosure of which is hereby incorporated by reference.

TECHNICAL FIELD

The present disclosure relates to the field of electronic apparatus technologies, and more particularly to a foldable electronic apparatus and a method for controlling the foldable electronic apparatus.

BACKGROUND

At present, electronic apparatuses may only be held in specific manners to make and answer calls for their relatively simple receiving structures. Especially, existing receiving structures may not meet call requirements of folded electronic apparatuses in diversified application scenarios.

SUMMARY

A foldable electronic apparatus is provided. The foldable electronic apparatus includes a casing assembly and a flexible display screen assembly disposed at the casing assembly. The casing assembly includes a first body, a second body, and a bendable body rotatably connected between the first body and the second body. The first body is rotatable relative to the second body via the bendable body to switch the foldable electronic apparatus between a folded state and an unfolded state. In the folded state, the first body and the second body overlap with each other. In the folded state, the first body is unfolded relative to the second body. The first body has a first surface opposite a first surface of the second body in response to that the first body and the second body overlap with each other. The first surface of the first body and the first surface of the second body cooperatively form a portion of an inner folding surface of the casing assembly. The flexible display screen assembly is disposed at the inner folding surface. The foldable electronic apparatus further defines a first acoustic opening in a second surface of the first body opposite the first surface of the first body, and a second acoustic opening in a side of the foldable electronic apparatus where the inner folding surface is located. The foldable electronic apparatus emits sounds through the first acoustic opening in response to that the foldable electronic apparatus is in the folded state and emits sounds through the second acoustic opening in response to that the foldable electronic apparatus is in the unfolded state.

A foldable electronic apparatus is provided. The foldable electronic apparatus includes a first body and a second body. The first body is rotatable relative to the second body to switch the foldable electronic apparatus between a folded state in which the first body and the second body overlap with each other and an unfolded state in which the first body is unfolded relative to the second body. The foldable electronic apparatus further defines a first acoustic opening and a second acoustic opening. The first acoustic opening is exposed outside in response to that the foldable electronic device is in the folded state and the second acoustic opening is exposed outside in response to that the foldable electronic device is in the unfolded state.

A method for controlling a foldable electronic apparatus is provided. The foldable electronic apparatus includes a first body, a second body, a first acoustic opening, a second acoustic opening, a first sounder facing the first acoustic opening, and a second sounder facing the second acoustic opening. the first body is rotatable relative to the second body to switch the foldable electronic apparatus between a folded state in which the first body and the second body overlap with each other and an unfolded state in which the first body is unfolded relative to the second body. The first acoustic opening is exposed outside in response to that the foldable electronic apparatus is in the folded state. The second acoustic opening is exposed outside in response to that the foldable electronic device is in the unfolded state. The method includes: determining, when there is an incoming call, whether a rotation angle of the first body relative to the second body equals a first threshold or a second threshold; controlling, the first sounder to emit sounds through the first acoustic opening in response to that the rotation angle of the first body relative to the second body equals the first threshold; and controlling, the second sounder to emit sounds through the second acoustic opening in response to that the rotation angle of the first body relative to the second body equals the second preset angle threshold.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
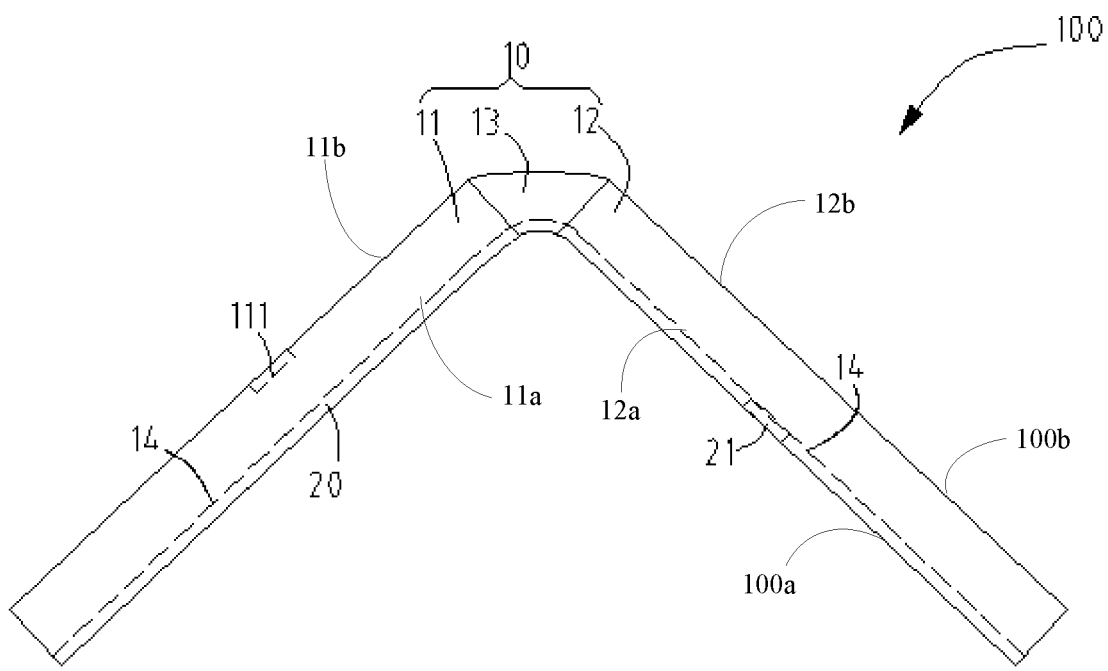
FIG. 1 is a first schematic structure view of a foldable electronic apparatus according to a first embodiment of the present disclosure.

Technical solutions of embodiments of the present disclosure will be described clearly and completely in combination with the accompanying drawings of the embodiments of the present disclosure. Obviously, the described embodiments are merely a part rather than all of embodiments of the present disclosure. All other embodiments obtained by those skilled in the art without creative efforts based on the embodiments of the present disclosure shall fall within the protection scope of the present disclosure.

In addition, the description of the following embodiments refers to the accompanying drawings to illustrate the specific embodiments that may be implemented in the present disclosure. The orientation or positional relationship term mentioned in the present disclosure, such as "top", "bottom", "up", "down", "front", "rear", "left", "right", "inside", "outside", "side", or the like is based on the orientation or positional relationship illustrated in the drawings, and is merely for convenience of description and simplified description, rather than implied or indicating that the device or component referred to must have a particular orientation, a structure and operated in a particular orientation, and thus is not to be construed as limiting the present disclosure.

The numerical range represented by "~" in the present disclosure means a range including the numerical values described before and after "~" as the minimum value and the maximum value, respectively. In the accompanying drawings, structures that are similar or identical are denoted by the same reference numerals.

A foldable electronic apparatus is provided. The foldable electronic apparatus includes a casing assembly and a flexible display screen assembly disposed at the casing assembly. The casing assembly includes a first body, a second body, and a bendable body rotatably connected between the first body and the second body. The first body is rotatable relative to the second body via the bendable body to switch the foldable electronic apparatus between a folded state and an unfolded state. In the folded state, the first body and the second body overlap with each other. In the folded state, the first body is unfolded relative to the second body. The first body has a first surface opposite a first surface of the second body in response to that the first body and the second body overlap with each other. The first surface of the first body and the first surface of the second body cooperatively form a portion of an inner folding surface of the casing assembly. The flexible display screen assembly is disposed at the inner folding surface. The foldable electronic apparatus further defines a first acoustic opening in a second surface of the first body opposite the first surface of the first body, and a second acoustic opening in a side of the foldable electronic apparatus where the inner folding surface is located. The foldable electronic apparatus emits sounds through the first acoustic opening in response to that the foldable electronic apparatus is in the folded state and emits sounds through the second acoustic opening in response to that the foldable electronic apparatus is in the unfolded state.

The second acoustic opening is defined in a portion of the flexible display screen assembly facing the first body.

The first body has a first connection end connecting the bendable body. A first free end disposed opposite the first connection end. A first side connecting the first connection end and the first free end. The first acoustic opening is adjacent to the first side.

The second acoustic opening on the first body has an orthographic projection spaced apart from the first acoustic opening.

The orthographic projection of the second acoustic opening on the first body is adjacent to the first side.

The first body further includes a second side opposite the first side. The orthographic projection of the second acoustic opening on the first body is adjacent to the second side.

The foldable electronic apparatus defines a third acoustic opening in a portion of the flexible display screen assembly facing the first body. The third acoustic opening on the first body has an orthographic projection adjacent to the first side.

In response to that the first body and the second body overlap with each other, the first body and the second body defines a gap communicating with the second acoustic opening to form a sound emitting channel for communicating with outside.

The second acoustic opening is defined in a portion of the flexible display screen assembly facing the second body.

The second body has a second connection end connected to the bendable body and a second free end disposed opposite the second connection end. The second acoustic opening on the second body has an orthographic projection located between the second connection end and the second free end.

The second body further includes a third side connecting the second connection end and the second free end. The orthographic projection of the second acoustic opening on the second body is adjacent to the third side.

The first acoustic opening is adjacent to an edge of the first body aligned with the third side.

The second body further includes a fourth side opposite the third side. The first acoustic opening is adjacent to an edge of the first body aligned with the fourth side.

The flexible display screen assembly further defines a third acoustic opening in a portion of the flexible display screen assembly facing the second body. The third acoustic opening on the second body has an orthographic projection adjacent to the fourth side.

In response to that the first body and the second body overlap with each other, the second acoustic opening and the portion of the flexible display assembly facing the second body defines a gap to form a sound emitting channel for communicating with the outside.

The flexible display assembly further includes a frame member fixedly connected to the first body and the second body. The second acoustic opening is defined in the frame member.

The flexible display screen assembly further includes a flexible display screen disposed at the inner folding surface of the casing assembly. The flexible display screen is fixedly connected to the first body and the second body. The frame member is located at a periphery of the flexible display screen.

The flexible display screen assembly includes a flexible display screen disposed at the inner folding surface of the casing assembly and a transparent cover disposed at a side of the flexible display screen opposite the casing assembly. The second acoustic opening is defined in the transparent cover.

A foldable electronic apparatus is provided. The foldable electronic apparatus includes a first body and a second body. The first body is rotatable relative to the second body to switch the foldable electronic apparatus between a folded state in which the first body and the second body overlap with each other and an unfolded state in which the first body is unfolded relative to the second body. The foldable electronic apparatus further defines a first acoustic opening and a second acoustic opening. The first acoustic opening is exposed outside in response to that the foldable electronic device is in the folded state and the second acoustic opening is exposed outside in response to that the foldable electronic device is in the unfolded state.

A method for controlling a foldable electronic apparatus is provided. The foldable electronic apparatus includes a first body, a second body, a first acoustic opening, a second acoustic opening, a first sounder facing the first acoustic opening, and a second sounder facing the second hole. the first body is rotatable relative to the second body to switch the foldable electronic apparatus between a folded state in which the first body and the second body overlap with each other and an unfolded state in which the first body is unfolded relative to the second body. The first acoustic opening is exposed outside in response to that the foldable electronic apparatus is in the folded state. The second acoustic opening is exposed outside in response to that the foldable electronic device is in the unfolded state. The method includes: determining, when there is an incoming call, whether a rotation angle of the first body relative to the second body equals a first threshold or a second threshold; controlling, the first sounder to emit sounds through the first acoustic opening in response to that the rotation angle of the first body relative to the second body equals the first threshold; and controlling, the second sounder to emit sounds through the second acoustic opening in response to that the rotation angle of the first body relative to the second body equals the second preset angle threshold.

Embodiment 1

As illustrated in FIG. 1, a foldable electronic apparatus 100 according to a first embodiment of the present disclosure is provided. The foldable electronic apparatus 100 includes a casing assembly 10 and a flexible display assembly 20 disposed at the casing assembly 10. The casing assembly 10 includes a first body 11, a second body 12, and a bendable body 13 rotatably connected between the first body 11 and the second body 12. The first body 11 may be rotatable relative to the second body 12 via the bendable body 30 to switch the foldable electronic apparatus 100 between a folded state and an unfolded state. In the folded state, the first body 11 and the second body 12 overlap with each other. In the folded state, the first body 11 is unfolded relative to the second body 12.

The first body 11 includes a first surface 11a and a second surface 11b opposite the first surface 11a. The second body 12 includes a first surface 12a and a second surface 12b opposite the first surface 12a. The foldable electronic apparatus 100 includes a first surface 100a and a second surface 100b opposite the first surface 100a. The first surface 11a of the first body 11 and the first surface 12a of the second body 12 are located at the first surface 100a of the foldable electronic apparatus 100. The second surface 11b of the first body 11 and the second surface 12b of the second body 12 are located at the second surface 100b of the foldable electronic apparatus 100. When the first body 11 and the second body 12 overlap with each other, the first surface 11a of the first body 11 faces the first surface 12a of the second body 12, the first surface 11a of the first body 11 and the first surface 12a of the second body 12 form a portion of an inner folding surface 14 of the casing assembly 10. The flexible display screen assembly 20 is disposed at the inner folding surface 14. In this embodiment, the flexible display unit 20 includes a flexible display screen 222 disposed at the inner folding surface 14.

The foldable electronic apparatus 100 may define a first acoustic opening 111, a second acoustic opening 21 therein. The foldable electronic apparatus 100 further includes a first sounder 40 corresponding to the first acoustic opening 111, and a second sounder 50 corresponding to the second acoustic opening 21. The first acoustic opening 111 may be exposed outside when the foldable electronic apparatus 100 is in the folded state, and the second acoustic opening 21 may be exposed outside when the foldable electronic device is in the unfolded state. Thus, the foldable electronic apparatus 100 may emit sounds through the first acoustic opening 111 by the first sounder 40 when the foldable electronic apparatus 100 is the folded state or the second acoustic opening 21 by the second sounder 50 when the foldable electronic apparatus 100 is the unfolded state.

It should be understood that, the foldable electronic apparatus 100 may be a smart phone, a tablet, a laptop, a wearable smart device, or the like.

The first acoustic opening 111 may be defined in the second surface 11b of the first body 11 opposite the inner folding surface 14 and the second acoustic opening 21 may be defined in the first surface 100a of the foldable electronic apparatus 100 where the inner folding surface 14 is located. In this way, the foldable electronic apparatus 100 may emit sounds through the first acoustic opening 111 or the second acoustic opening 21 when making and answering a call according to the positional relationship between the first body 11 and the second body 12 or the state of the foldable electronic apparatus 100, thereby meeting call requirements of the foldable electronic apparatus 100 in different application scenarios and improving the user experience.

Figure 2:
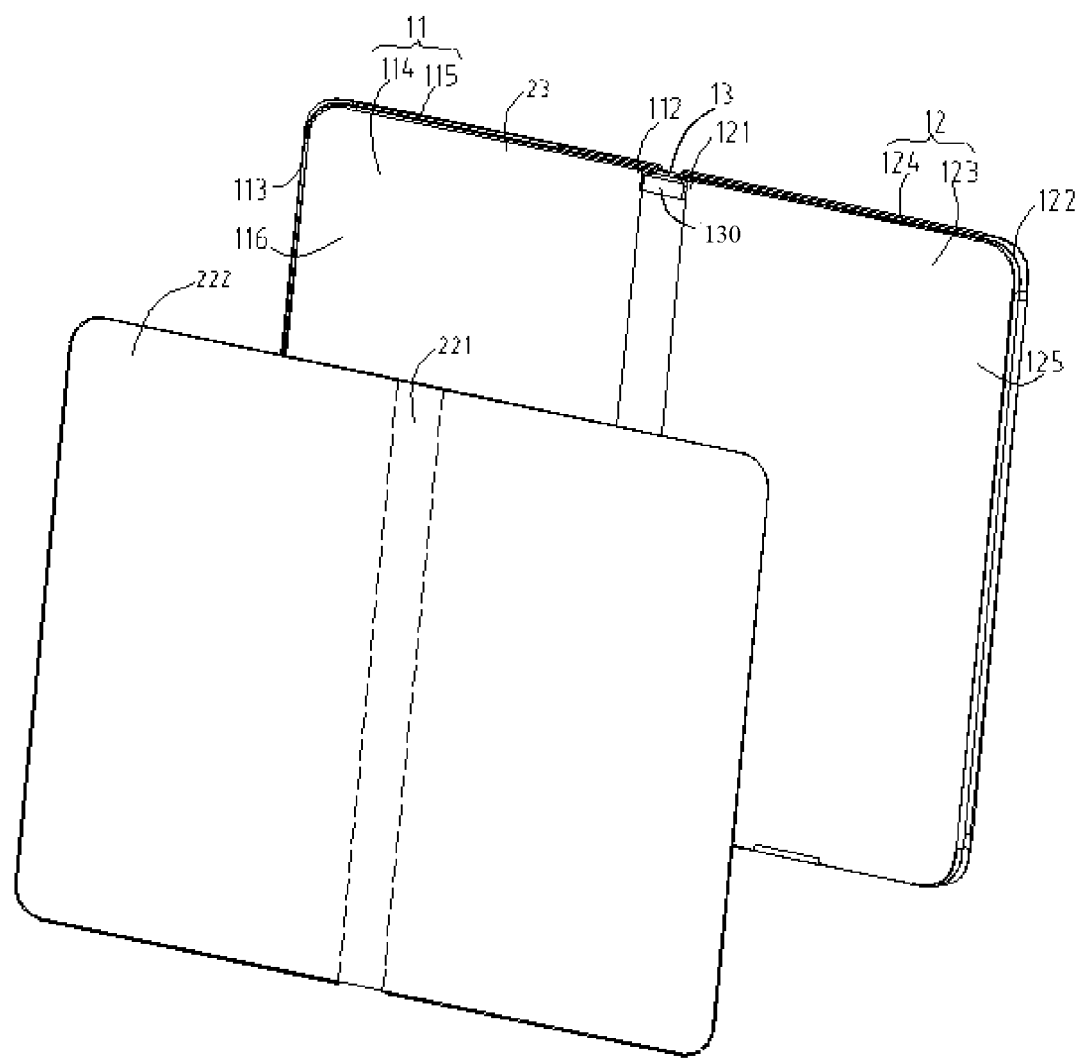
FIG. 2 is an exploded perspective view of the foldable electronic apparatus of FIG. 1.

As illustrated in FIG. 2, the first body 11 has a first connection end 112 connected to the bendable body 13, and a first free end 113 disposed opposite the first connection end 112. The first body 11 further includes a first support plate 114 connected between the first connection end 112 and the first free end 113, and a first side plate 115 attached to a peripheral edge of the first support plate 114. The first support plate 114 and the first side plate 115 cooperatively defined a first receiving cavity 116. The first receiving cavity 116 may be configured to receive functional components therein, such as a main board, a battery, a speaker, a receiver, and the like.

The second body 12 has a second connection end 121 connected to the bendable body 13, and a second free end 122 disposed opposite the second connection end 121. The second body 12 further includes a second support plate 123 connected between the second connection end 121 and the second free end 122, and a second side plate 124 attached to a peripheral edge of the second support plate 123. The second support plate 123 and the second side plate 124 cooperatively define a second receiving cavity 125. The second receiving cavity 125 may be configured to receive functional components therein, such as a main board, a battery, a speaker, a receiver, and the like.

Figure 3:
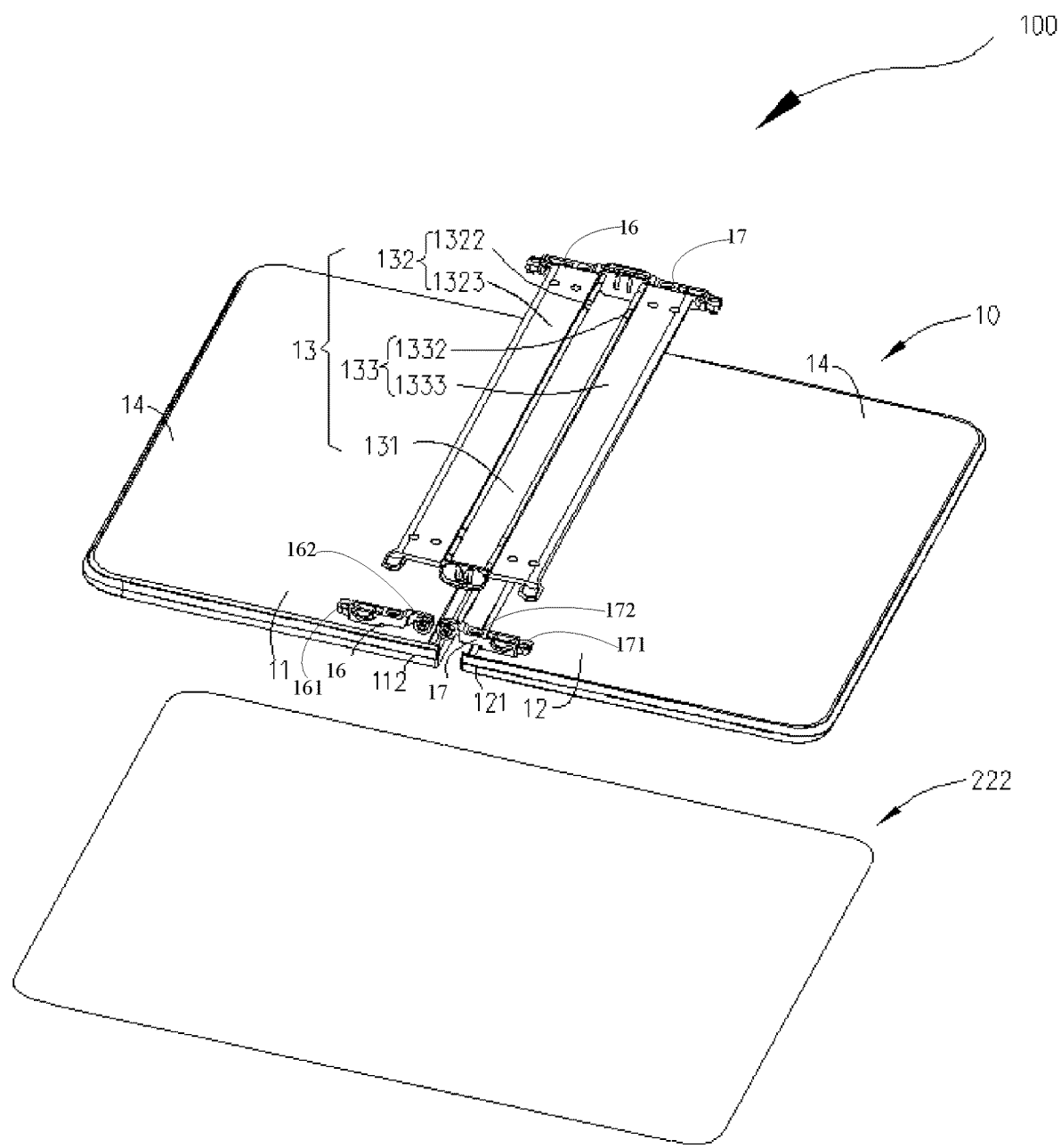
FIG. 3 is another exploded perspective view of the foldable electronic apparatus of FIG. 1.

As illustrated in FIG. 3, the bendable body 13 includes a base 131, a first movable assembly 132, and a second movable assembly 133. The base 131 is rotatably connected between the first connection end 112 and the second connection end 121. The first movable assembly 132 is retractable. The first movable assembly 132 has a first edge rotatably connected to the first body 11 and a second edge opposite the first edge rotatably connected to the base 131. The second movable assembly 133 is retractable. The second movable assembly 133 has a first edge rotatably connected to the second body 12 and a second edge opposite the first edge rotatably connected to the base 131. When the first body 11 is rotatable relative to the second body 12 to bend the flexible display screen 222, the first body 11 drives the first movable assembly 132 to rotate together and the second body 11 drives the second movable assembly 133 to rotate together. The first movable assembly 132, the second movable assembly 133, and the base 131 cooperatively define a receiving space 134 configured to receive a bent portion of the flexible display screen 222.

Figure 4:
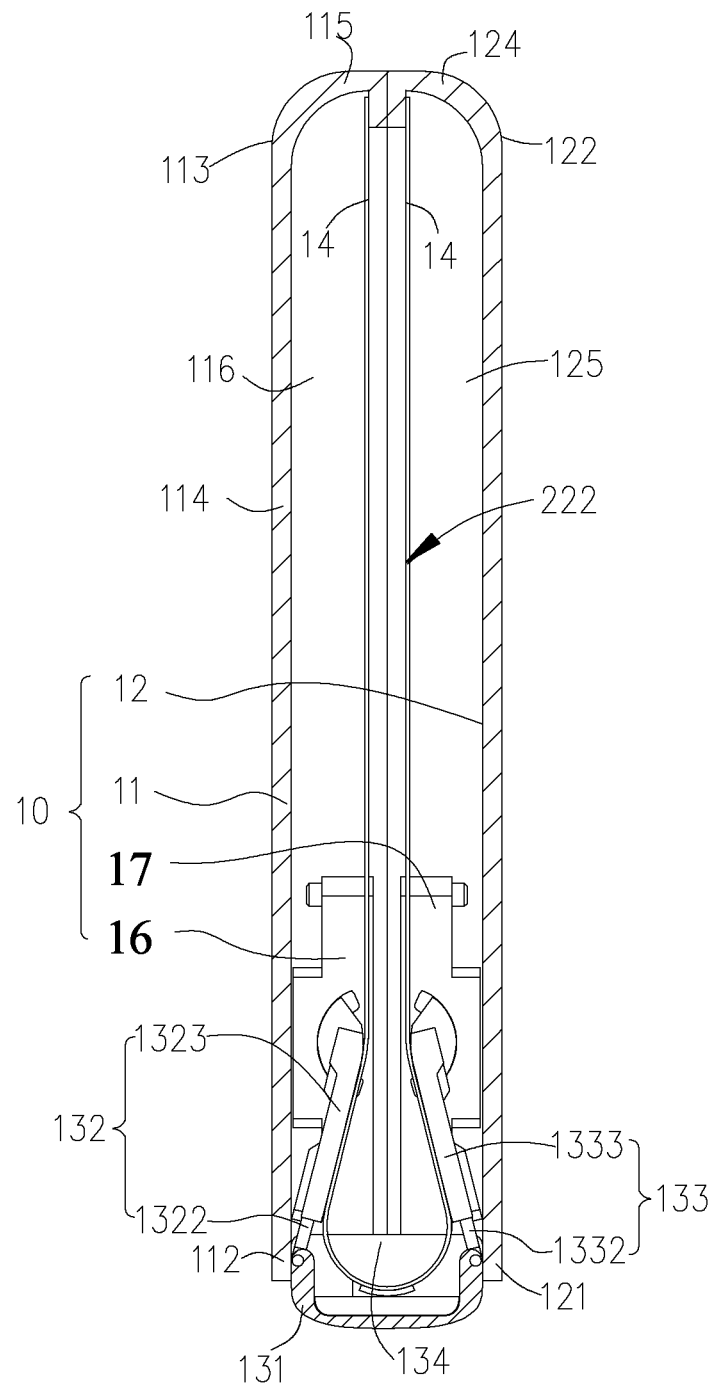
FIG. 4 is a second schematic structure view of a foldable electronic apparatus according to the first embodiment of the present disclosure.

As illustrated in FIG. 4, the casing assembly 10 further includes a pair of first rotating arms 16 disposed at opposite ends of the first movable assembly 132. Each of the first rotating arms 16 includes a first end 161 fixedly attached to the first connection end 112 and a second end 162 rotatably attached to the base 131. The pair of first rotating arms 16 may drive the first body 11 to rotate relative to the base 131 for balancing the rotation of the first body 11 relative to the second body 12. The first movable assembly 132 further includes a first rotating member 1322 and a first support member 1323. The first rotating member 1322 is rotatably connected to the base 131.

The casing assembly 10 further includes a pair of second rotating arms 17 disposed at opposite ends of the second movable assembly 133. Each of the second rotating arms 17 includes a first end 171 fixedly attached to the second connection end 121 and a second end 172 rotatably attached to the base 131. The pair of second rotating arms 17 drive the second body 12 to rotate relative to the base 131 for balancing the rotation of the second body 12 relative to the first body 11. The second movable assembly 133 further includes a second rotating member 1332 and a second supporting member 1333. The second rotating member 1332 is rotatably connected to the base 131.

When the first body 11 is rotated toward the second wire body 12, the first body 11 drives the first support member 1323 to slide away from the first rotating member 1322 and the second body 12 drives the second support member 1333 to slide away from the second rotating member 1332. An end of the first support member 1323 away from the base 131 and an end of the second support member 1333 away from the base 131 are moved close to each other to support the flexible display screen 222. At this time, the receiving space 134 cooperatively defined by the first movable assembly 132, the second movable assembly 133, and the base 131 is with a larger size for receiving the bent portion of the flexible display screen 222.

When the first body 11 is rotated away from the second body 12, the first support member 1323 is slid toward the first rotating member 1322, and the second support member 1333 is slid toward the second rotating member 1332. The first support member 1323 aligns with the second support member 1333, or is coplanar with the second support member 1333. The first support member 1323 and the second support member 1333 are respectively moved toward opposite edges of the base 131 to support the flexible display screen 222.

The bendable body 13 has an outer surface 130 facing the flexible display screen 222, which forms a portion of the inner folding surface 14.

The flexible display screen 222 is fixedly attached to the first side plate 115 and the second side plate 124. The flexible display screen 222 covers the first receiving cavity 116 and the second receiving cavity 125. The flexible display screen 222 is flexible. The flexible display screen 222 includes a bendable portion 221 corresponding to the bendable body 13. When the first body 11 is unfolded relative to the second body 12, that is, the foldable electronic apparatus 100 is in the unfolded state, the flexible display screen 222 is in a flat state and the bendable body 13 provides a flat support for the bendable portion 221. When the first body 11 and the second body 12 overlap with each other, that is, the foldable electronic apparatus 100 is in the folded state, the bendable portion 221 has the largest curvature, and the flexible display screen 222 is in a folded state and is located between the first body 11 and the second body 12.

Figure 5:
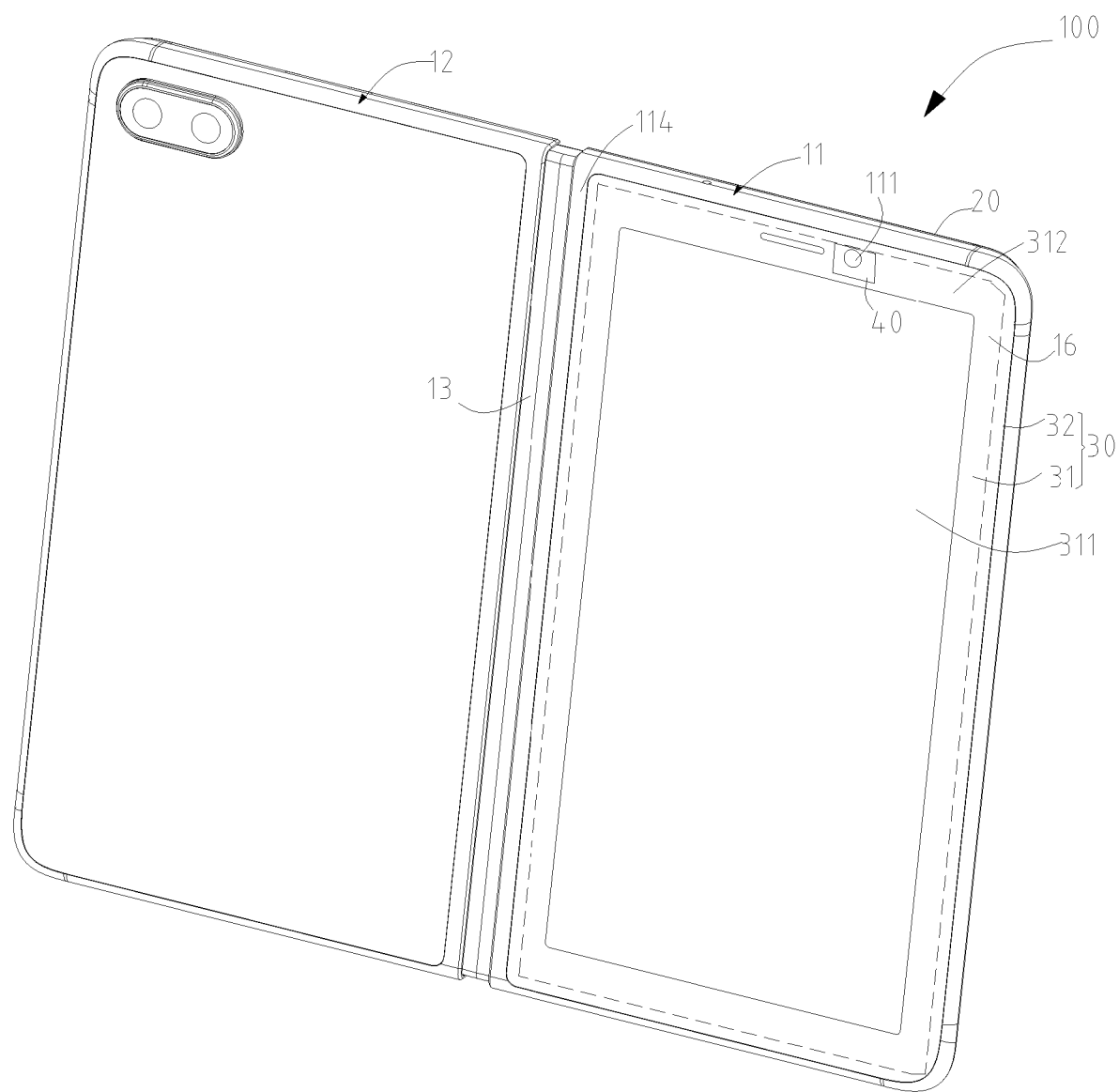
FIG. 5 is a third schematic structure view of a foldable electronic apparatus according to the first embodiment of the present disclosure.

As illustrated in FIG. 5, the foldable electronic apparatus 100 further includes a first display unit 30 attached to the first body 11. In particular, the first display unit 30 is attached to the first support plate 114. When the first body 11 and the second body 12 overlap with each other, that is, the foldable electronic apparatus 100 is in the folded state, the first display unit 30 is located at the second surface 11b of the first body 11 opposite the second body 12. When the foldable electronic apparatus 100 is in the folded state, the first display unit 30 may be used as a front display screen to display information. When the foldable electronic apparatus 100 is in the unfolded state, the flexible display screen 222 may be used as a front display screen to display information. In this way, different display screens of the foldable electronic apparatus 100 may be used to display information according to practical requirements, thereby improving the user experience. The first display unit 30 includes a first display screen 31 and a transparent cover 32 disposed at the first display screen 31. The first display screen 31 has a display area 311 and a non-display area 312 connected the display area 311. The first acoustic opening 111 is defined in an area of the transparent cover 32 facing the non-display area 312 of the first display screen 31. The first sounder 40 is attached to the first body 11. The first sounder 40 is disposed in the first receiving cavity 116 and faces the first acoustic opening 111. The first sounder 40 may be a receiver. In this way, the sounder 40 may emit sounds through the first acoustic opening 111. In other embodiments, the first sounder 40 may be a speaker, or an electronic component with the function of a receiver and a speaker.

Figure 6:
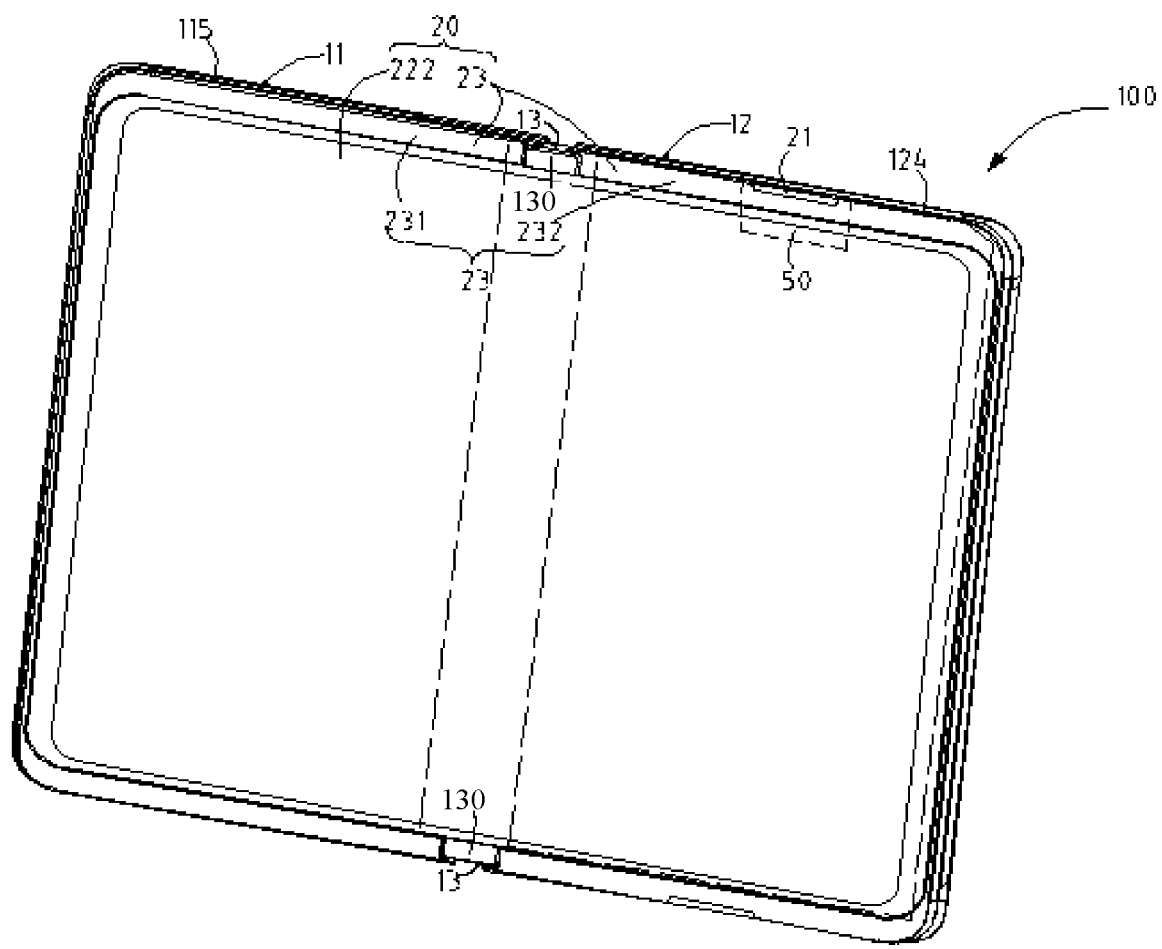
FIG. 6 is a fourth schematic structure view of a foldable electronic apparatus according to the first embodiment of the present disclosure.

As illustrated in FIG. 6, the foldable electronic apparatus 100 further includes a frame member 23 fixedly connected between the flexible display screen 222 and the casing assembly 10. The frame member 23 is configured to protect a periphery edge of the flexible display screen 222. The first frame 231 and the second frame 232 both are substantially U-shaped. The first frame 231 is attached to the first body 11 and the second frame 232 is attached to the second body 12. The first frame 231 and the second frame 232 cooperatively form a rectangular structure. The first frame 231 may be attached to an edge of the first side plate 115 away from the first support plate 114 by screws, adhesives, snaps, or the like. The second frame 232 may be attached to an edge of the second side plate 124 away from the second support plate 123 by screws, adhesives, snaps, or the like. The first frame 231 includes a first board 2311, a second board 2312 disposed opposite the first board 2311, and a third board 2313 connecting the first board 2311 and the second board 2312. The third board 2313 is located adjacent to the first free end 113. The first board 2311, the second board 2312, and the third board 2313 are attached to the flexible display screen 222. The second frame 232 includes a first board 2321, a second board 2322 disposed opposite the first board 2321, and a third board 2323 connecting the first board 2321 and the second board 2322. The second board 2322 aligns with the second board 2312. The third board 2323 is located adjacent to the second free end 122. In particular, the second acoustic opening 21 may be defined in the frame member 23, that is, the second acoustic opening 21 may be defined in the first frame 231 or the second frame 232.

The second sounder 50 may be a speaker. The foldable electronic apparatus 100 may emit sounds by the second sounder 50 through the second acoustic opening 21, such as playing music, sound prompt, or sound information. When the first body 11 and the second body 12 overlap with each other, that is, the foldable electronic apparatus 100 is in the folded state, the second acoustic opening 21 is located between the first body 11 and the second body 12 to be concealed, thereby ensuring the foldable electronic apparatus 100 has a simple appearance. In other embodiments, the second sounder 50 may also be a receiver, or an electronic component having the function of a receiver and a speaker.

Figure 7:
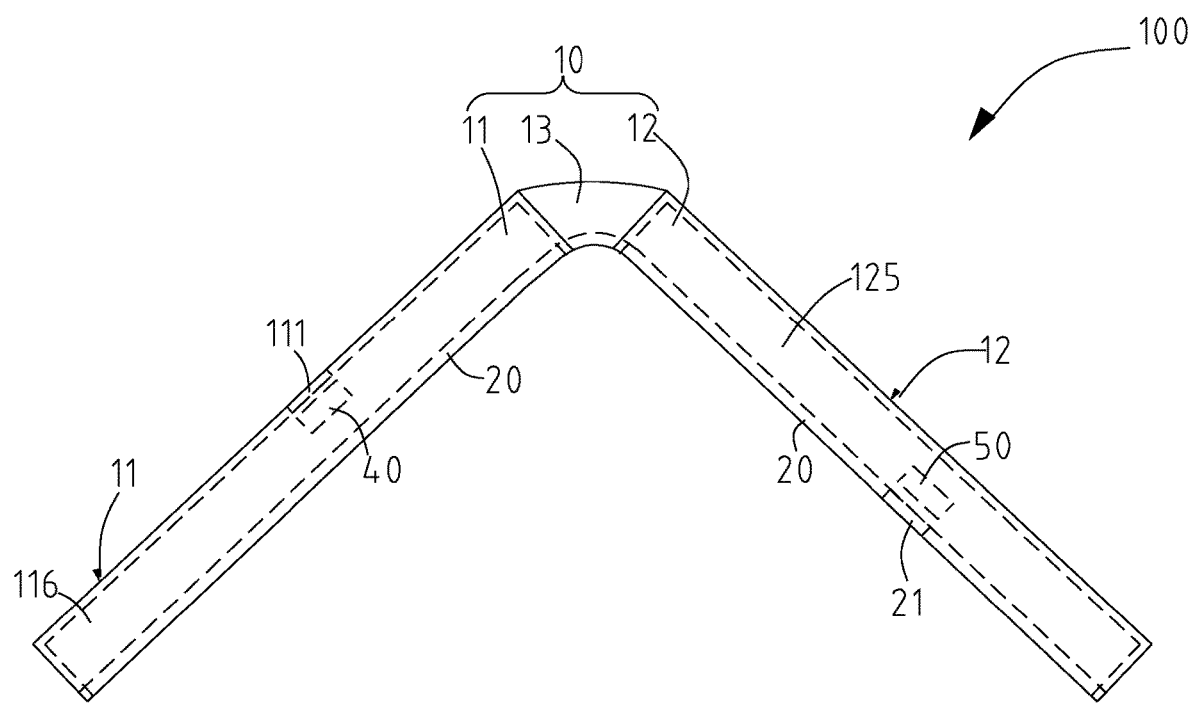
FIG. 7 is a fifth schematic structure view of a foldable electronic apparatus according to the first embodiment of the present disclosure.

As illustrated in FIG. 7, the first acoustic opening 111 is defined in the first body 11 and the second acoustic opening 21 is defined in a portion of the flexible display screen assembly 20 facing the first body 11, that is, the first acoustic opening 111 and the second acoustic opening 21 are respectively defined in first body 11 and the second body 12 of the foldable electronic apparatus 100. In particular, the second acoustic opening 21 is defined in the second frame 232. The first sounder 40 is disposed in the first receiving cavity 116 and the second sounder 50 is disposed in the second receiving cavity 125, that is, the first sounder 40 and the second sounder 50 are respectively disposed in two separate receiving spaces, thereby preventing the first sounder 40 and the second sounder 50 from interfering with each other. The first acoustic opening 111 and the second acoustic opening 21 are respectively defined in first body 11 and the second body 12, thereby avoiding many acoustic openings defined in the first body 11 or the second body 12 to affect the appearance of the foldable electronic apparatus 100.

Figure 8:
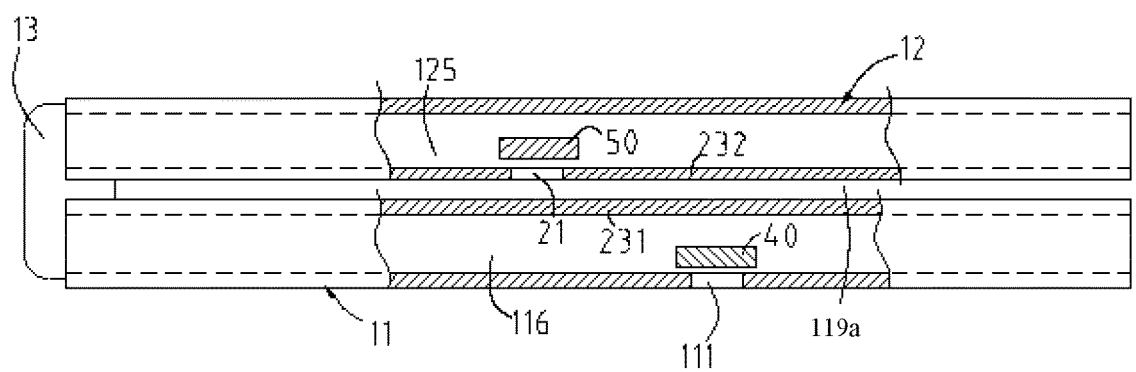
FIG. 8 is a sixth schematic structure view of a foldable electronic apparatus according to the first embodiment of the present disclosure.

As illustrated in FIG. 8, when the first body 11 and the second body 12 overlap with each other, that is, the foldable electronic apparatus 100 is the folded state, the first body 11 and the second body 12 defines a gap communicating with the second acoustic opening 21 to form a sound emitting channel 119a for communicating with outside. The gap is further located between the first frame 231 and the second frame 232 such that the frame member 23 may prevent foreign matter from entering into the gap to scratch the flexible display screen 222. When the first body 11 and the second body 12 overlap with each other, that is, the foldable electronic apparatus 100 is in the folded state, the foldable electronic apparatus 100 may emit sounds through the sound emitting channel 119a and the second acoustic opening 21. In this way, there is no need to define acoustic openings in the frame member, thereby ensuring the foldable electronic apparatus 100 has a simple appearance. The second acoustic opening 21 may be used as a acoustic opening of a speaker such that the foldable electronic apparatus 100 may emit sounds through the second acoustic opening 21. For example, when the foldable electronic apparatus 100 is the folded state, the user may make or answer the call through the sound emitting channel 119a and the second acoustic opening 21 in a hand-free manner.

Figure 9:
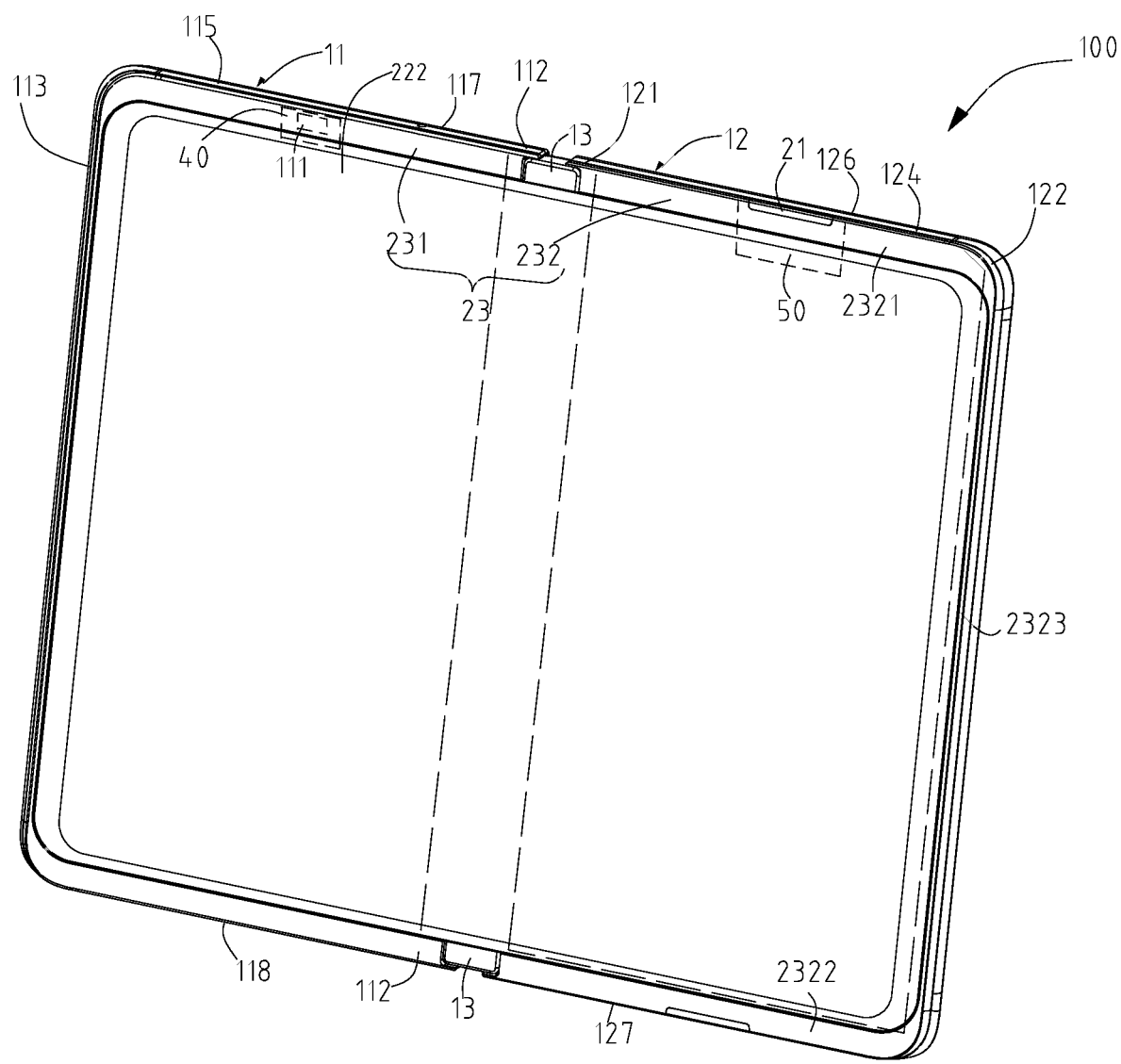
FIG. 9 is a seventh schematic structure view of a foldable electronic apparatus according to the first embodiment of the present disclosure.

As illustrated in FIG. 9, the second acoustic opening 21 on the second body 12 has an orthographic projection located between the second connection end 121 and the second free end 122. The second body 12 further has a third side 126 and a fourth side 127 disposed opposite the third side 126. The third side 126 connects the second connection end 121 and the second free end 122. The fourth side 127 connects the second connection end 121 and the second free end 122. The orthographic projection of the second acoustic opening 21 on the second body 12 is adjacent to the third side 126 of the second body 12. In particular, the second acoustic opening 21 is defined in the second frame 232. The first board 2321 of the second frame 230 on the second body 12 has an orthographic projection adjacent to the third side 126 of the second body 12. In particular, the second acoustic opening 21 is defined in the first board 2321. The second board 2322 on the second body 12 has an orthographic projection adjacent to the fourth side 127.

The first body 11 includes a first side 117 and a second side 118 disposed opposite the first side 117. The first side 117 connects the first connection end 112 and the first free end 113. The second side 118 connects the first connection end 112 and the first free end 113.

As illustrated in FIG. 9, as an implementation, the first acoustic opening 111 may be defined adjacent to an edge of the first body 11 aligned with the third side 126. The first side 117 is an edge of the first body 11 aligned with the third side 126, that is, the first side 117 aligns with the third side 126. The second side 118 is an edge of the first body 11 aligned with the fourth side 127, that is, the second side 118 aligns with the fourth side 127. The first acoustic opening 111 is defined adjacent to the first side 117. Thus, the first acoustic opening 111 and the second acoustic opening 21 are both located at a top portion of the foldable electronic apparatus 100. The user may answer the call through the first acoustic opening 111 or the second acoustic opening 21 with his/her ear close to the top portion of the foldable electronic apparatus 100. For example, when the foldable electronic apparatus 100 is in the folded state, the user may hear sounds emitted from the second acoustic opening 21 through the sound emitting channel 119a with his/her the ear closer to the top portion of the foldable electronic apparatus 100.

Figure 10:
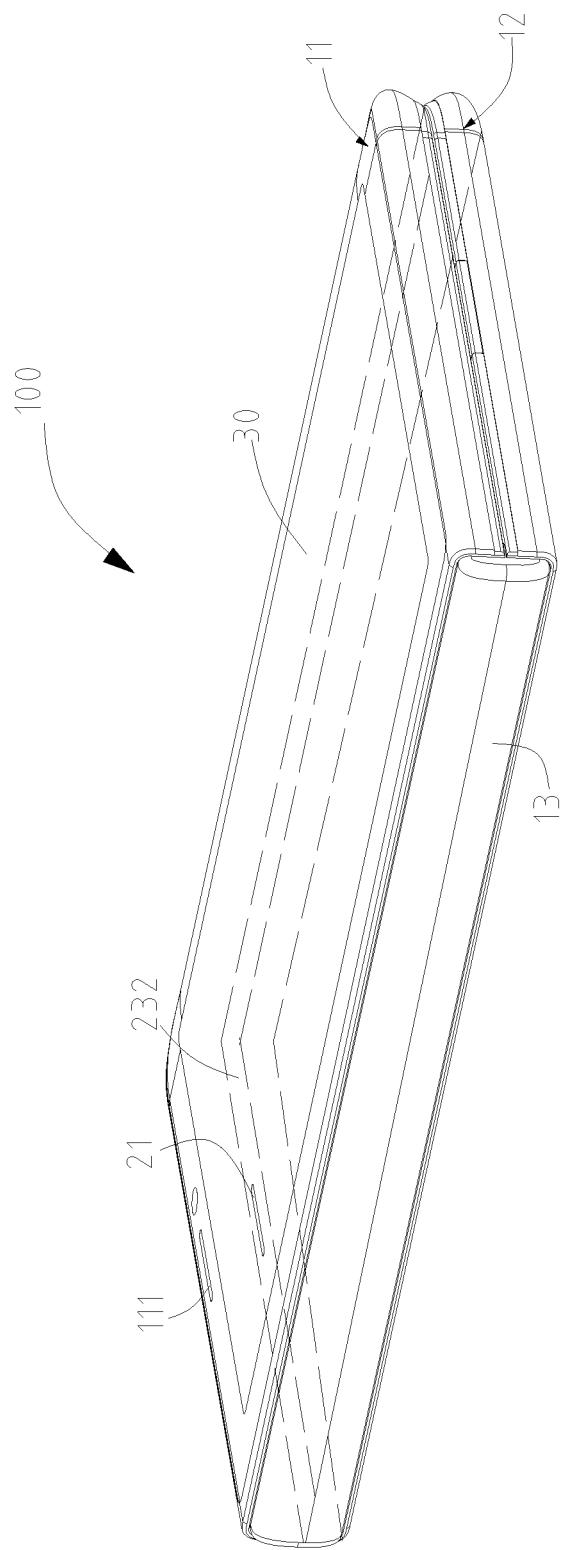
FIG. 10 is an eighth schematic structure view of a foldable electronic apparatus according to the first embodiment of the present disclosure

As illustrated in FIG. 8 and FIG. 10, the second acoustic opening 21 may be defined in the second frame 232. When the first body 11 and the second body 12 overlap with each other, that is, the foldable electronic apparatus 100 is in the folded state, the second frame 232 faces the first body 11. The second acoustic opening 21 and the first display unit 30 of the first body 11 face the same direction. When the first display unit 30 faces the user, the sound from the second acoustic opening 21 may be transmitted toward the user, thereby preventing the content of the call from leaking when the user answers the call via the second acoustic opening 21.

Figure 11:
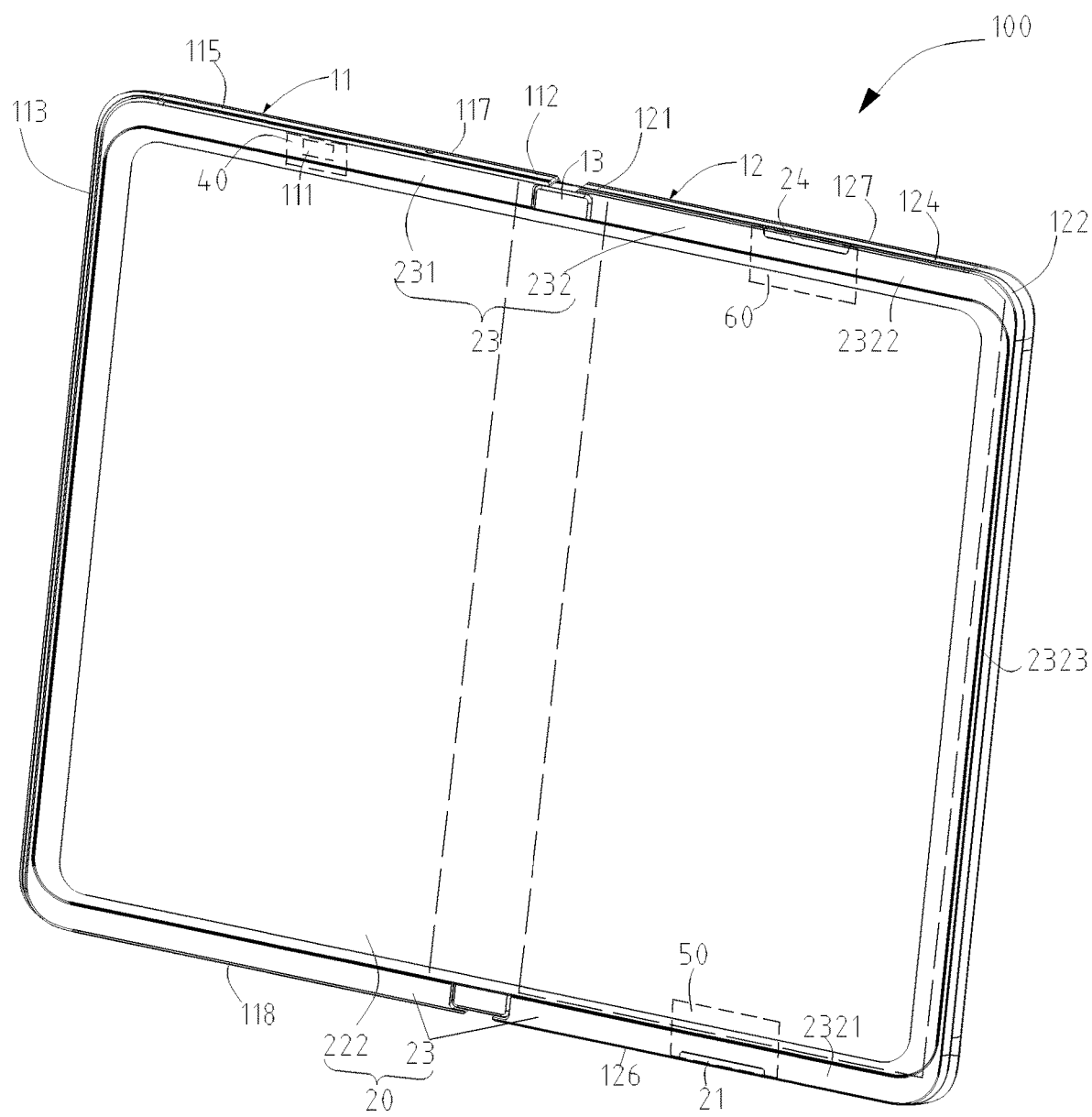
FIG. 11 is a ninth schematic structure view of a foldable electronic apparatus according to the first embodiment of the present disclosure.

As illustrated in FIG. 11, as another implementation, the first acoustic opening 111 may be defined adjacent to an edge of the first body 11 aligned with the second side 127. The first side 117 is an edge of the first body 11 aligned with the fourth side 127, that is, the first side 117 aligns with the fourth side 127. The second side 118 is an edge of the first body 11 aligned with the third side 126, that is, the second side 118 aligns with the third side 126. Thus, the first acoustic opening 111 and the second acoustic opening 21 are respectively located at opposite ends of the foldable electronic apparatus 100. A distance between the first sounder 40 and the second sounder 50 is long, which may prevent the first sounder 40 and the second sounder 50 from interfering with each other during operation.

As illustrated in FIG. 11, the foldable electronic apparatus 100 may further include a third acoustic opening 24 defined therein, and a third sounder 60 corresponding to the third acoustic opening 24. The third acoustic opening 24 is defined in the second frame 232. The third acoustic opening 24 on the second body 12 has an orthographic projection adjacent to the fourth side 127. The second acoustic opening 21 is defined in the first board 2321 of the second frame 232 and the third acoustic opening 24 is defined in the second board 2322 of the second frame 232. The second sounder 50 faces the second acoustic opening 21 and the third sounder 60 faces the third acoustic opening 24, which may produce a stereo effect when the foldable electronic apparatus 100 emits sounds.

Figure 12:
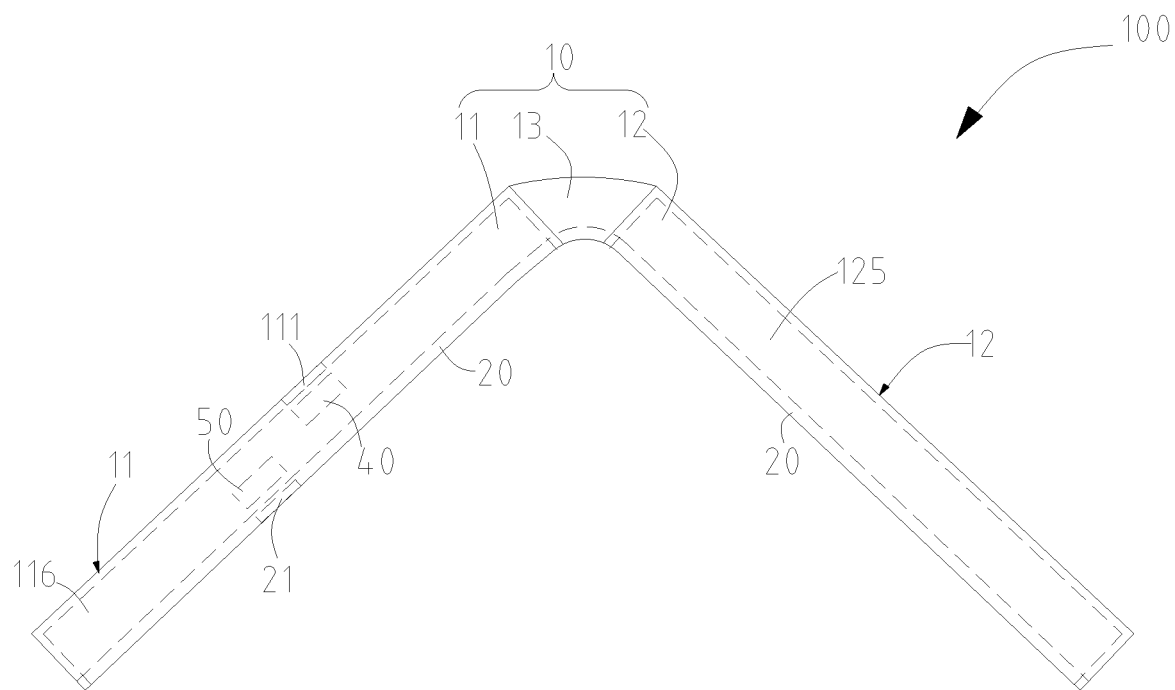
FIG. 12 is a tenth schematic structure view of a foldable electronic apparatus according to the first embodiment of the present disclosure.

As illustrated in FIG. 12, as a further implementation, the second acoustic opening 21 may be defined in a portion of the flexible display screen assembly 20 facing the first body 11, and the first acoustic opening 111 may be defined in the first frame 231. Thus, the first acoustic opening 111 and the second acoustic opening 21 are located on the opposite sides of the first body 11 of the foldable electronic apparatus 100. Therefore, there is no acoustic opening defined in the portion the flexible display screen assembly 20 facing the first body 11, thereby ensuring the foldable electronic apparatus 100 has a simple appearance and improving the user experience. The first sounder 40 and the second sounder 50 are both disposed in the first receiving cavity 116 of the first body 11. The orthographic projection of the second acoustic opening 21 on the first body 11 is spaced from the first acoustic opening 111, that is, the first sounder 40 and the second sounder 50 are not stacked, which may reduce the thickness of the foldable electronic apparatus 100.

Figure 14:
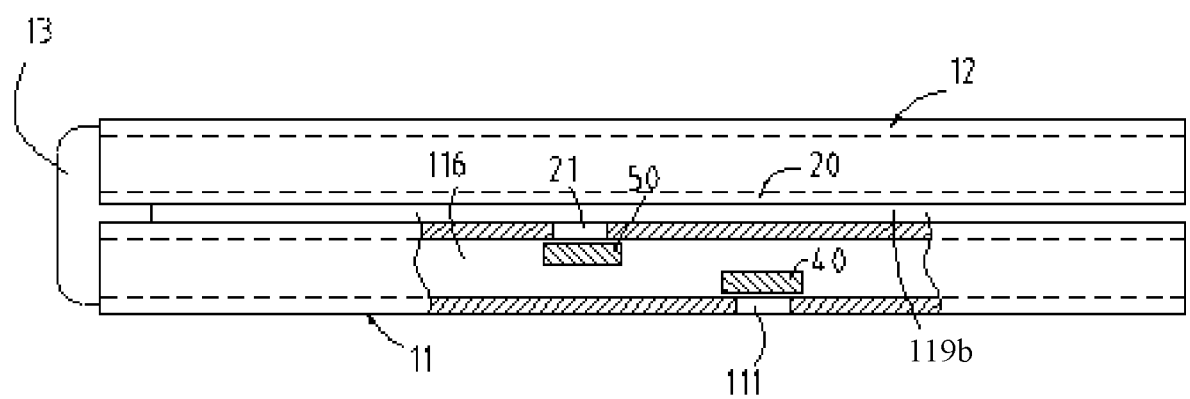
FIG. 14 is a twelfth schematic structure view of a foldable electronic apparatus according to the first embodiment of the present disclosure.

As illustrated in FIG. 14, in the embodiment, when the first body 11 and the second body 12 overlap with each other, that is, the foldable electronic apparatus 100 is the folded state, the first body 11 and the second body 12 defined a gap communicating with the second acoustic opening 21 to form a sound emitting channel 119b for communicating with outside. In particular, the gap is defined between the first frame 231 and the second frame 232. When the foldable electronic apparatus 100 is in the folded state, that is, the first body 11 and the second body 12 overlap with each other, the foldable electronic apparatus 100 may emit sounds through the sound emitting channel 119b and the second acoustic opening 21. In this way, there is no need to define acoustic openings in the frame member, thereby ensuring the foldable electronic apparatus 100 has a simple appearance.

Figure 13:
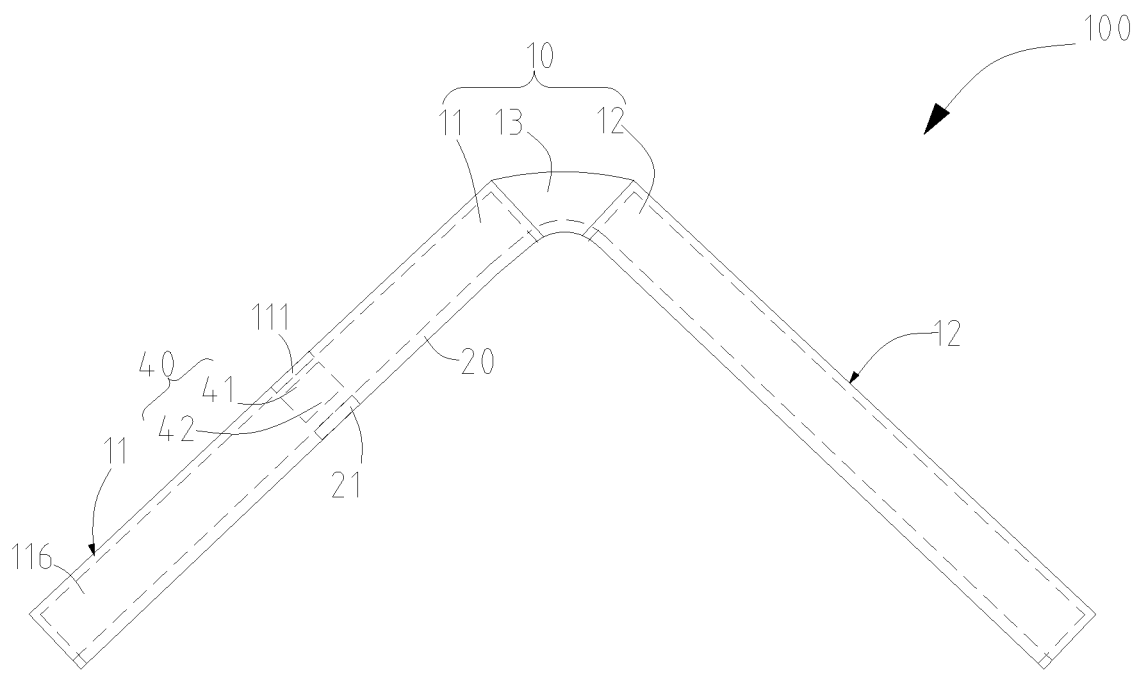
FIG. 13 is an eleventh schematic structure view of a foldable electronic apparatus according to the first embodiment of the present disclosure.

As illustrated in FIG. 13, as an additional implementation, the orthographic projection of the second acoustic opening 21 on the first body 11 at least partially overlaps with the first acoustic opening 111. The first sounder 40 includes a first sounding portion 41 and a second sounding portion 42 disposed opposite the first sounding portion 41. The first sounding portion 41 faces the first acoustic opening 111, and the second sounding portion 42 faces the second acoustic opening 21. Thus, the first acoustic opening 111 and the second acoustic opening 21 both correspond to the sounder 40, thereby reducing the thickness of the folded electronic device 100.

Figure 15:
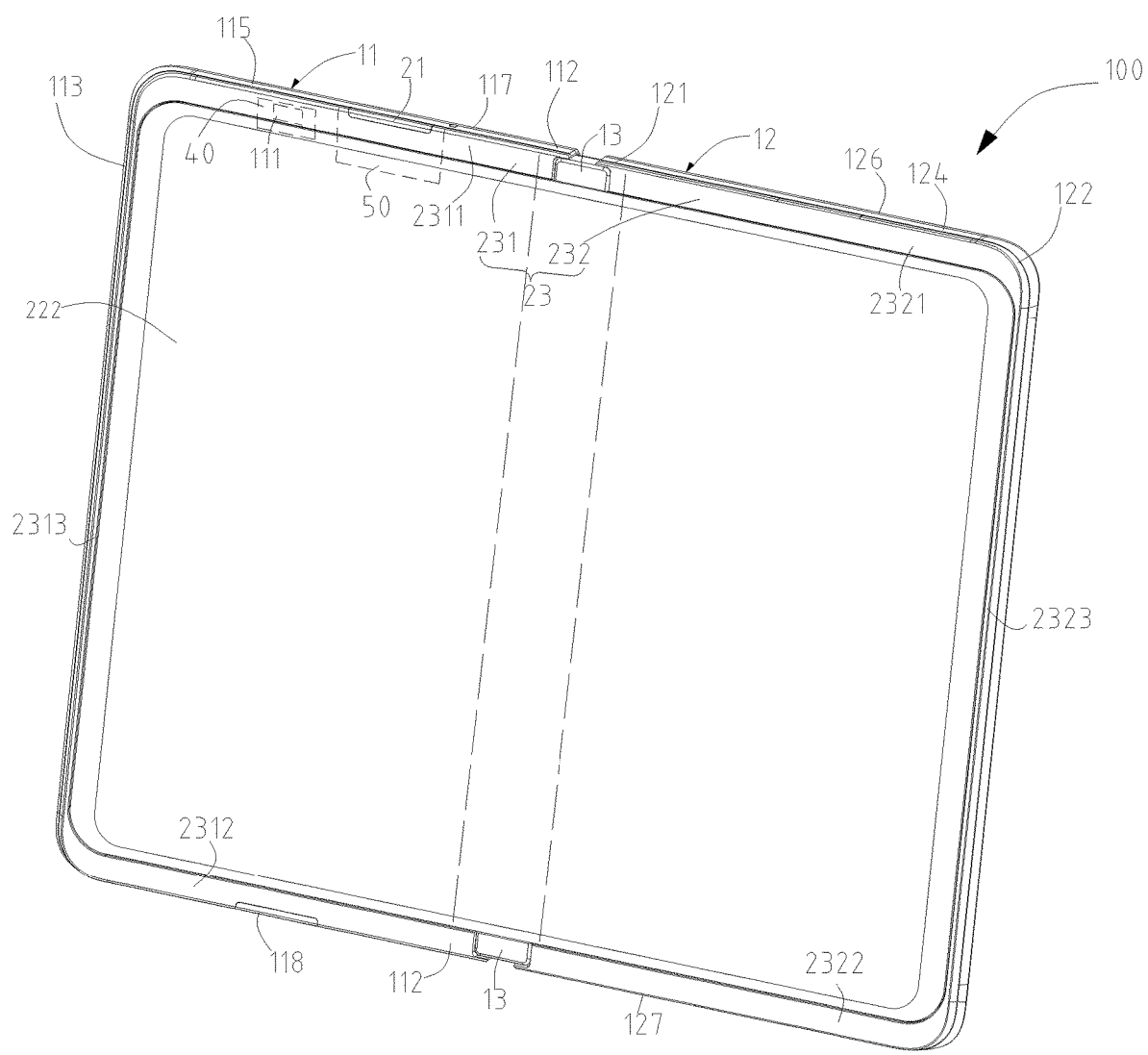
FIG. 15 is a thirteenth schematic structure view of a foldable electronic apparatus according to the first embodiment of the present disclosure.

As illustrated in FIG. 15, as a further additional implementation, the first acoustic opening 111 may be defined in the first body 11 adjacent to the first side 117. The second acoustic opening 21 may be defined in the first frame 231. The first board 2311 on the first body 11 has an orthographic projection adjacent to the first side 117, and The second board 2312 on the first body 11 has an orthographic projection adjacent to the second side 118. The third board 2313 is attached to the first free end 113. The first board 2311, the second board 2312, and the third board 2313 are attached to the edge of the flexible display screen 222.

As illustrated in FIG. 15, the orthographic projection of the second acoustic opening 21 on the first body 11 is adjacent to the first side 117. In particular, the first acoustic opening 111 is defined in the first board 2311. Thus, the first acoustic opening 111 and the second acoustic opening 21 are both close to the top portion of the foldable electronic apparatus 100. In this way, the user may answer the call through the first acoustic opening 111 or the second acoustic opening 21 with his/her ear close to the top portion of the foldable electronic apparatus 100.

Figure 16:
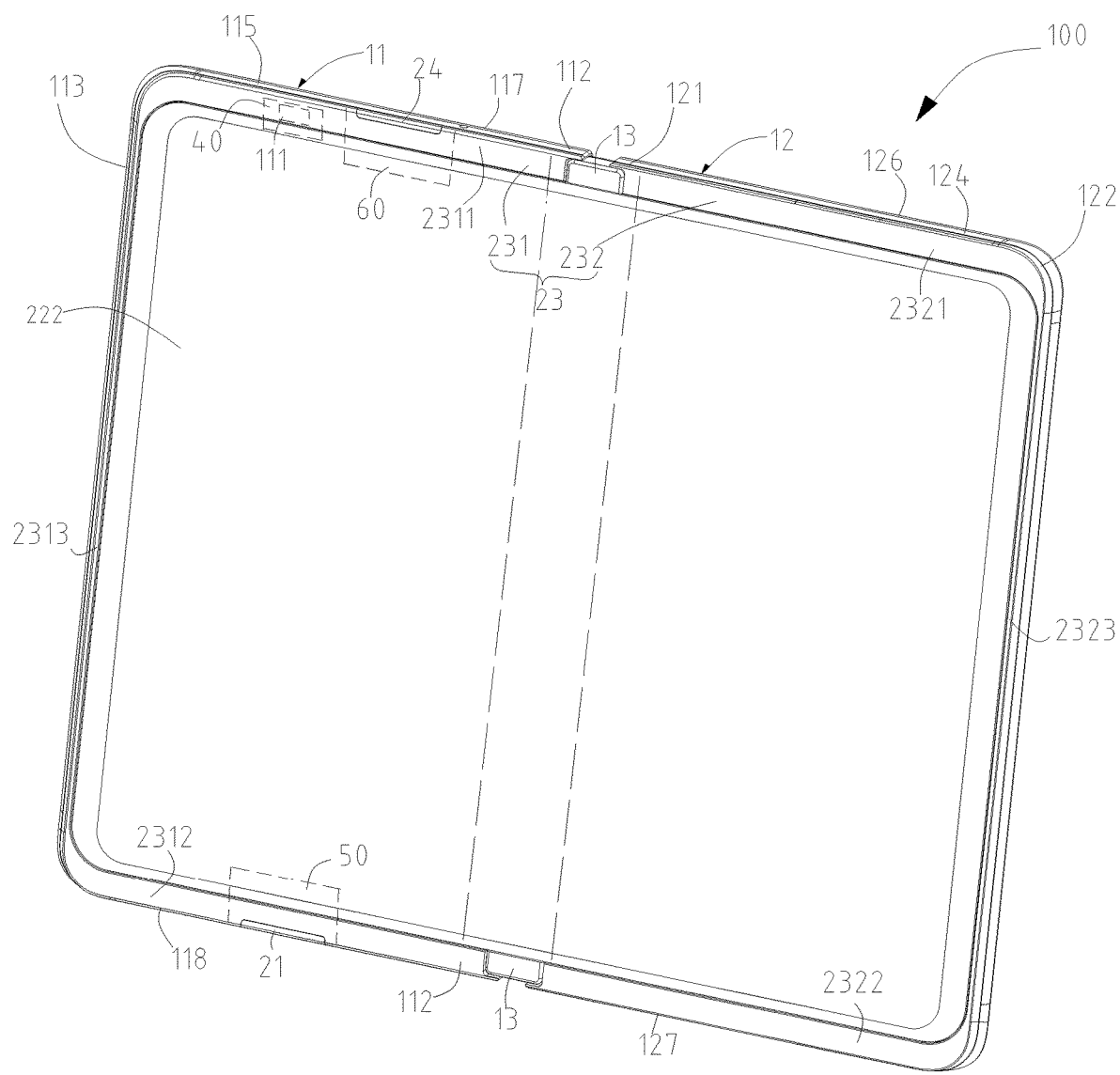
FIG. 16 is a fourteenth schematic structure view of a foldable electronic apparatus according to the first embodiment of the present disclosure.

As illustrated in FIG. 16, as a further another implementation, the orthographic projection of the second acoustic opening 21 on the first body 11 may be adjacent to the second side 118. The first acoustic opening 111 is defined in the second board 2312. Thus, the first acoustic opening 111 and the second acoustic opening 21 are located at opposite ends of the foldable electronic apparatus 100. Thus, the first sounder 40 faces the first acoustic opening 111 and the second sounder 50 faces the second acoustic opening 21. A distance between the first sounder 40 and the second sounder 50 is long, which may prevent the first sounder 40 and the second sounder 50 from interfering with each other during operation. The flexible display screen assembly 20 further includes a third acoustic opening 24 defined in the portion of the flexible display screen assembly 20 facing the first body 11. The third acoustic opening 24 on the first body 11 has an orthographic projection adjacent to the first side 117. The third acoustic opening 24 is defined in the first board 2311. The third sounder 60 may be a speaker. The second sounder 50 faces the second acoustic opening 21 and the third sounder 60 faces the third acoustic opening 24, which may produce a stereo effect when the foldable electronic apparatus 100 emits sounds. In addition, when the foldable electronic apparatus 100 is in the folded state, the second body 12 and the first body 11 defines a gap communicating with the second acoustic opening 21 to form a sound emitting channel for communicating with outside. When the first body 11 and the second body 12 overlap with each other, that is, the foldable electronic apparatus 100 is in the folded state, the foldable electronic apparatus 100 may emit sounds through the sound emitting channels, the second acoustic opening 21, and the third acoustic opening 24, which may produce a stereo effect and ensure the quality of the sounds. In other embodiments, the second acoustic opening 21 is defined in the third board 2313.

Embodiment 2

Figure 17:
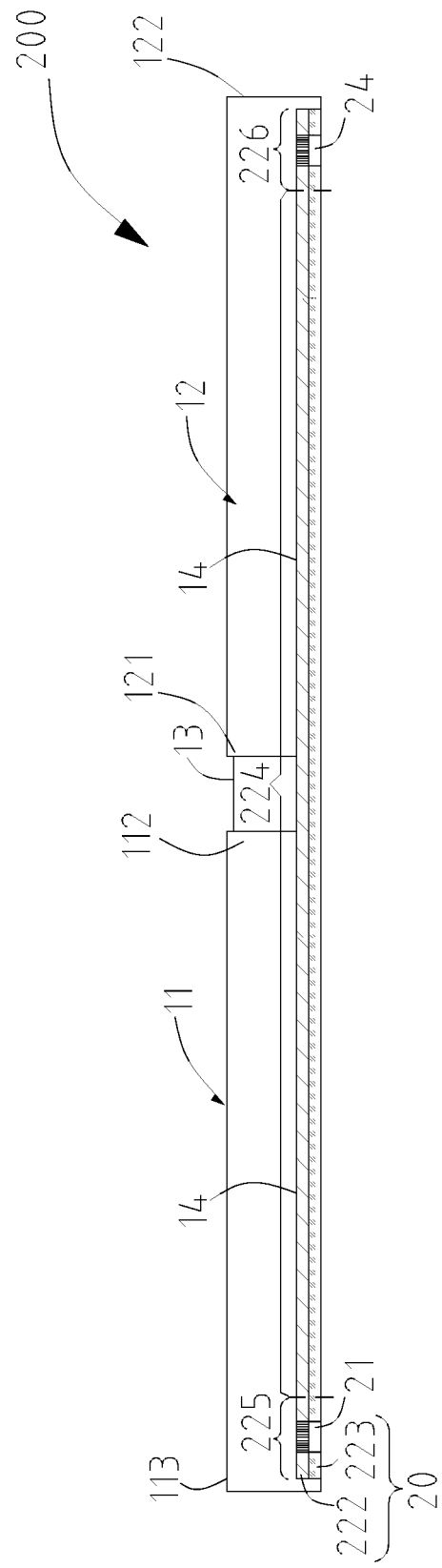
FIG. 17 is a schematic structure view of a foldable electronic apparatus according to a second embodiment of the present disclosure.

As illustrated in FIG. 17, a foldable electronic apparatus 200 according to a second embodiment of the present disclosure is provided. The foldable electronic apparatus 200 in the second embodiment is different from the foldable electronic apparatus 100 in the first embodiment in that a transparent cover 223 disposed at a side of the flexible display screen 222 opposite the casing assembly 10, and the flexible display screen 222 including a first display area 224, a first non-display area 225 connecting the first display area 224, and a second non-display area 226. The second acoustic opening 21 is defined in the transparent cover 223.

In this embodiment, the transparent cover 223 is flexible. In particular, the second acoustic opening 21 is defined in a portion of the transparent cover 223 facing the first non-display area 225. The flexible display screen 222 is attached to and located between the first free end 113 and the second free end 122 of the casing assembly 10. The second non-display area 226 is connected to an edge of the first display area 224 away from the first non-display area 225. The first non-display area 225 is located adjacent to the first free end 113 of the flexible display screen 222, and the second non-display area 226 is located adjacent to the second free end 122 of the flexible display screen 222. The second acoustic opening 21 is defined in a portion the first non-display area 225 facing the transparent cover 223, which may fully utilize the space of foldable electronic apparatus 200 and avoid acoustic openings defined in the casing assembly, thereby ensuring the foldable electronic apparatus 200 has a simple appearance. The third acoustic opening 24 is defined in a portion of the transparent cover 223 facing the second non-display area 226. Therefore, the foldable electronic apparatus 200 may emit sounds by the second sounder 50 facing the second acoustic opening 21 and the third sounder 60 facing the third acoustic opening 24, which produces a stereo effect.

Figure 18:
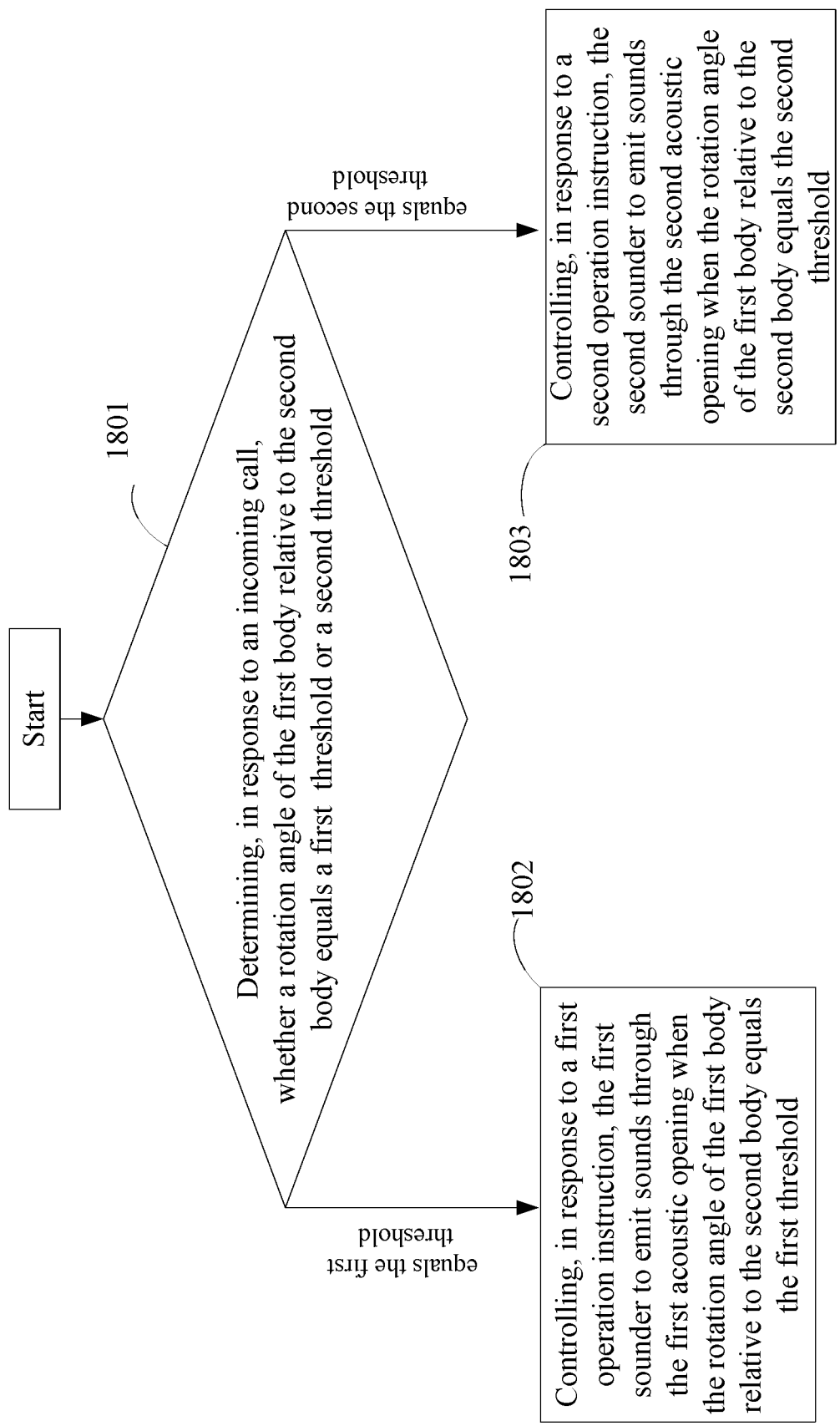
FIG. 18 is a schematic flowchart of a method for controlling a foldable electronic apparatus according to the first embodiment of the present disclosure.

As illustrated in FIG. 18, a method for controlling the foldable electronic apparatus according to a first embodiment of the present disclosure is provided. The method includes operations at the following blocks.

When the foldable electronic apparatus receives an incoming call, the foldable electronic apparatus may remind the user by playing a ring tone or vibrating.

At block 1801, when there is the incoming call, whether the rotation angle of the first body 11 relative to the second body 12 equaling a first threshold or a second threshold is determined.

At block 1801, sensors, such as Hall sensors, distance sensors, or an angle sensor, are disposed at the first body 11 and the second body 12 for sensing the rotation angle of the first body 11 relative to the second body 12. The first threshold is a preset value corresponding to the angle between the first body 11 and the second body 12 when the foldable electronic apparatus is in the folded state. The second threshold is a preset value corresponding to the angle between the first body 11 and the second body 12 when the foldable electronic apparatus is in the unfolded state. When the foldable electronic apparatus is in the folded state, the first body 11 and the second body 12 overlap with each other. When the foldable electronic apparatus is in the unfolded state, the first body 11 is unfolded relative to the second body 12. Therefore, by detecting whether the rotation angle of the first body 11 relative to the second body 12 equals the first threshold and the second threshold, it is determined whether the first body 11 and whether the second body 12 overlap with each other or whether the first body 11 is unfolded relative to the second body 12. In other embodiments, the sensors may be disposed at the bendable body 13.

At block 1802, when the rotation angle of the first body 11 relative to the second body 12 equals the first threshold, in response to a first operation instruction, the first sounder 40 is controlled to emit sounds through the first acoustic opening 111.

At block 1802, when the rotation angle of the first body 11 relative to the second body 12 equals the first threshold, that is, the foldable electronic apparatus is in the folded state, the processor may control the first display unit 30 disposed at the first body 11 to display information to remind the user there is an incoming call. The foldable electronic apparatus may receive the first operation instruction through a touch display screen, a light sensor, a microphone, a mechanical button, or the like.

At block 1803, when the rotation angle of the first body 11 relative to the second body 12 equals the second threshold, that is, the foldable electronic apparatus is in the unfolded state, in response to a second operation instruction, the second sounder 50 is controlled to emit sounds through the second acoustic opening 21. When the rotation angle of the first body 11 relative to the second body 12 equals the second threshold, that is, the foldable electronic apparatus is in the unfolded state and the processor may control the flexible display screen 222 to display information to remind the user there is an incoming call. The foldable electronic apparatus may receive the second operation instruction through a touch display screen, a light sensor, a microphone, a mechanical button, or the like.

Figure 19:
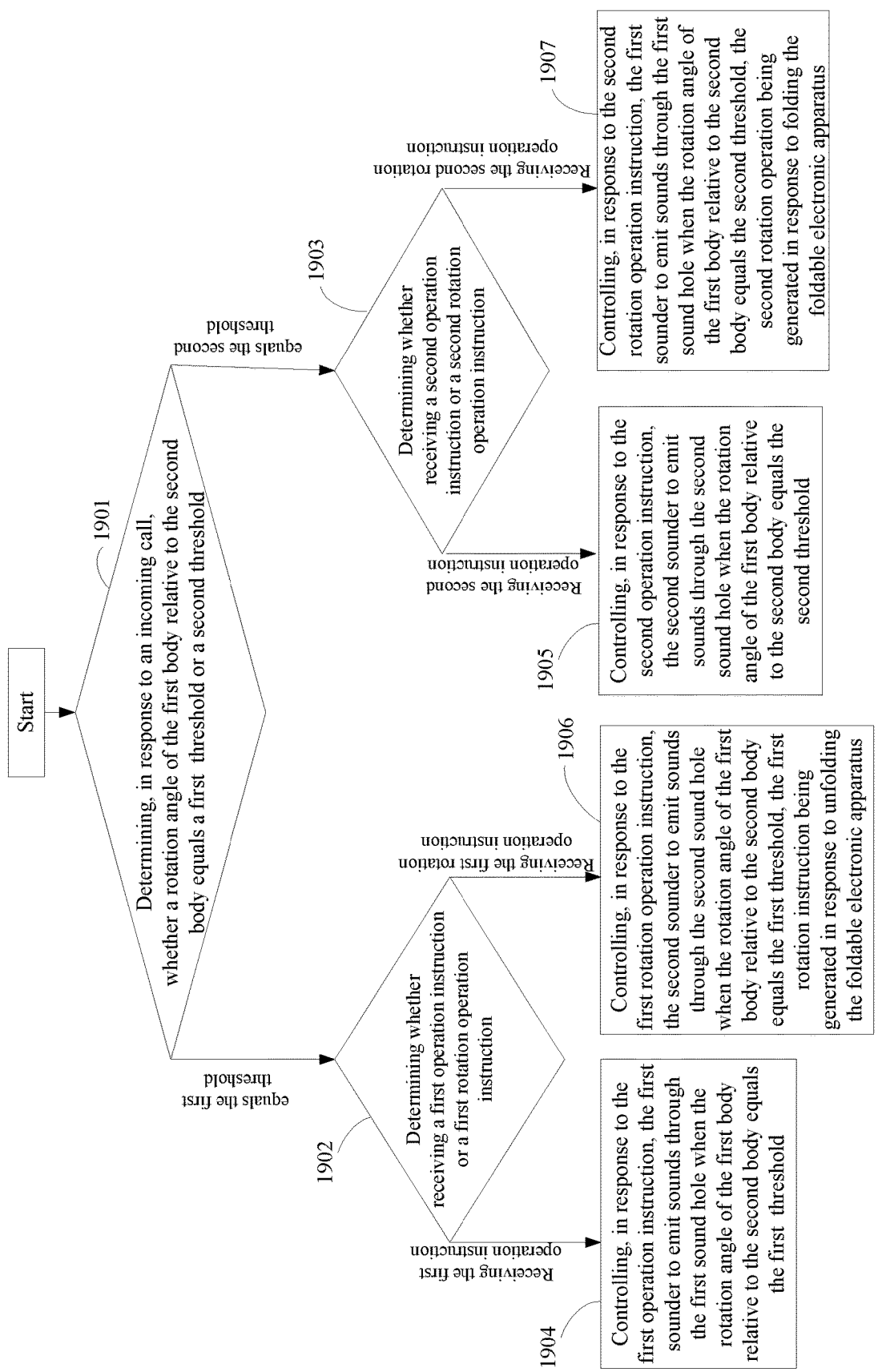
FIG. 19 is a schematic flowchart of a method for controlling a foldable electronic apparatus according to the second embodiment of the present disclosure.

As illustrated in FIG. 19, a method for controlling a foldable electronic apparatus according to a second embodiment of the present disclosure is provided. The method includes operations at the following blocks.

When the foldable electronic apparatus receives an incoming call, the foldable electronic apparatus may remind a user by playing a ring tone or vibrating.

At block 1901, when there is the incoming call, whether the rotation angle of the first body 11 relative to the second body 12 equaling a first threshold or a second threshold is determined.

At block 1902, whether receiving a first operation instruction or a first rotation operation instruction is further determined when the rotation angle of the first body 11 relative to the second body 12 equals the first threshold.

At block 1904, when receiving the first operation instruction, the first sounder is controlled to emit sounds through the first acoustic opening when the rotation angle of the first body relative to the second body equals the first threshold.

At block 1906, when receiving the first rotation operation instruction, the second sounder is controlled to emit sounds through the second acoustic opening when the rotation angle of the first body relative to the second body equals the first threshold. The first rotation operation instruction is generated in response to unfolding the foldable electronic apparatus. The first body 11 is further determined whether to be rotated away from the second body 12 when the rotation angle of the first body relative to the second body equals the first threshold. When the first body 11 is determined to be rotated away from the second body 12, the processor controls the second sounder 50 to emit sounds through the second acoustic opening 21. The first body 11 is determined to be rotated away from the second body 12 based on whether the angle between the first body 11 and the second body 12 is increased and whether an increase in angle equals a first preset rotation value.

At block 1903, whether receiving a second operation instruction or a second rotation operation instruction is further determined when the rotation angle of the first body 11 relative to the second body 12 equals the second threshold.

At block 1905, when receiving the second operation instruction, the second sounder is controlled to emit sounds through the second acoustic opening when the rotation angle of the first body relative to the second body equals the second threshold.

At block 1907, when receiving the second rotation operation instruction, the first sounder is controlled to emit sounds through the first acoustic opening when the rotation angle of the first body relative to the second body equals the second threshold. The second rotation operation instruction is generated in response to folding the foldable electronic apparatus when the rotation angle of the first body relative to the second body equals the second threshold. The first body 11 is further determined to be rotated toward the second body 12. When the first body 11 is determined to be rotated toward the second body 12, the processor controls the first sounder 40 to emit sounds through the first acoustic opening 111. The first body 11 is determined to be rotated toward the second body 12 based on whether the angle between the first body 11 and the second body 12 is decreased and whether a decrease in angle equals a second preset rotation value.

In the foldable electronic apparatus and the method for controlling the foldable electronic apparatus provided in the present disclosure, the first acoustic opening is defined in the second side of the first body opposite the inner folding surface and the second acoustic opening is defined in the side of the foldable electronic apparatus where the inner folding surface is located, which allows the foldable electronic apparatus to selectively emit sounds through the first acoustic opening or the second acoustic opening when making and answering the call according to the positional relationship between the first body and the second body, thereby meeting call requirements of the foldable electronic apparatus in different application scenarios and improving the user experience.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A foldable electronic apparatus, comprising:
    a casing assembly, comprising:
        a first body;
        a second body; and
        a bendable body rotatably connected between the first body and the second body;
        the first body being rotatable relative to the second body via the bendable body to switch the foldable electronic apparatus between a folded state and an unfolded state, in the folded state, the first body and the second body overlapping with each other, and in the unfolded state, the first body being unfolded relative to the second body;
        the first body having a first surface, the first surface being opposite to a first surface of the second body when the first body and the second body overlap with each other, and the first surface of the first body and the first surface of the second body cooperatively forming a portion of an inner folding surface of the casing assembly; and
    a flexible display screen assembly, disposed at the inner folding surface;
    the foldable electronic apparatus further defining a first acoustic opening in a second surface of the first body opposite the first surface of the first body, and a second acoustic opening in a side of the foldable electronic apparatus where the inner folding surface is located; and
    the foldable electronic apparatus configured to emit sounds through the first acoustic opening in response to that the foldable electronic apparatus is in the folded state, and emit sounds through the second acoustic opening in response to that the foldable electronic apparatus is in the unfolded state.

2. The foldable electronic apparatus of claim 1, wherein the second acoustic opening is defined in a portion of the flexible display screen assembly facing the first body.

3. The foldable electronic apparatus of claim 2, wherein the first body has a first connection end connecting the bendable body, a first free end disposed opposite the first connection end, and a first side connecting the first connection end and the first free end; and the first acoustic opening is adjacent to the first side.

4. The foldable electronic apparatus of claim 3, wherein the second acoustic opening on the first body has an orthographic projection spaced apart from the first acoustic opening.

5. The foldable electronic apparatus of claim 4, wherein the orthographic projection of the second acoustic opening on the first body is adjacent to the first side.

6. The foldable electronic apparatus of claim 4, wherein the first body further comprises a second side opposite the first side, and the orthographic projection of the second acoustic opening on the first body is adjacent to the second side.

7. The foldable electronic apparatus of claim 6, further defining a third acoustic opening in a portion of the flexible display screen assembly facing the first body, wherein the third acoustic opening on the first body has an orthographic projection adjacent to the first side.

8. The foldable electronic apparatus of claim 2, wherein in response to that the first body and the second body overlap with each other, the first body and the second body defines a gap communicating with the second acoustic opening to form a sound emitting channel for communicating with outside.

9. The foldable electronic apparatus of claim 1, wherein the second acoustic opening is defined in a portion of the flexible display screen assembly facing the second body.

10. The foldable electronic apparatus of claim 9, wherein the second body has a second connection end connected to the bendable body and a second free end disposed opposite the second connection end; and the second acoustic opening on the second body has an orthographic projection located between the second connection end and the second free end.

11. The foldable electronic apparatus of claim 10, wherein the second body further comprises a third side connecting the second connection end and the second free end; and the orthographic projection of the second acoustic opening on the second body is adjacent to the third side.

12. The foldable electronic apparatus of claim 11, wherein the first acoustic opening is adjacent to an edge of the first body aligned with the third side.

13. The foldable electronic apparatus of claim 11, wherein the second body further comprises a fourth side opposite the third side; and the first acoustic opening is adjacent to an edge of the first body aligned with the fourth side.

14. The foldable electronic apparatus of claim 13, wherein the flexible display screen assembly further defines a third acoustic opening in a portion of the flexible display screen assembly facing the second body; and the third acoustic opening on the second body has an orthographic projection adjacent to the fourth side.

15. The foldable electronic apparatus of claim 9, wherein in response to that the first body and the second body overlap with each other, the second acoustic opening and the portion of the flexible display screen assembly facing the second body defines a gap to form a sound emitting channel for communicating with the outside.

16. The foldable electronic apparatus of claim 15, wherein the flexible display screen assembly further comprises a flexible display screen disposed at the inner folding surface of the casing assembly, wherein the flexible display screen is fixedly connected to the first body and the second body; and a frame member is located at a periphery of the flexible display screen.

17. The foldable electronic apparatus of claim 1, wherein the flexible display screen assembly comprises a flexible display screen disposed at the inner folding surface of the casing assembly and a transparent cover disposed at a side of the flexible display screen opposite the casing assembly; and the second acoustic opening is defined in the transparent cover.

18. A foldable electronic apparatus, comprising:
a first body; and
a second body;
the first body being rotatable relative to the second body to switch the foldable electronic apparatus between a folded state in which the first body and the second body overlap with each other and an unfolded state in which the first body is unfolded relative to the second body;
the foldable electronic apparatus further defining a first acoustic opening and a second acoustic opening, the first acoustic opening being exposed outside in response to that the foldable electronic apparatus is in the folded state, and the second acoustic opening being exposed outside in response to that the foldable electronic apparatus is in the unfolded state; and
the foldable electronic apparatus emitting sounds through the first acoustic opening in response to that the foldable electronic apparatus is in the folded state, and emitting sounds through the second acoustic opening in response to that the foldable electronic apparatus is in the unfolded state.

19. A method for controlling a foldable electronic apparatus, the foldable electronic apparatus comprising a first body, a second body, a first acoustic opening, a second acoustic opening, a first sounder facing the first acoustic opening, and a second sounder facing the second acoustic opening; the first body being rotatable relative to the second body to switch the foldable electronic apparatus between a folded state in which the first body and the second body overlap with each other and an unfolded state in which the first body is unfolded relative to the second body, the first acoustic opening being exposed outside in response to that the foldable electronic apparatus is in the folded state, and the second acoustic opening being exposed outside in response to that the foldable electronic apparatus is in the unfolded state, the method comprising:
determining, when there is an incoming call, whether a rotation angle of the first body relative to the second body equals a first threshold or a second threshold;
controlling, the first sounder to emit sounds through the first acoustic opening in response to that the rotation angle of the first body relative to the second body equals the first threshold; and
controlling, the second sounder to emit sounds through the second acoustic opening in response to that the rotation angle of the first body relative to the second body equals the second threshold.

20. The method of claim 19, further comprising:
controlling, in response to a first operation instruction, the first sounder to emit sounds through the first acoustic opening in response to that the rotation angle of the first body relative to the second body equals the first threshold; and
controlling, in response to a second operation instruction, the second sounder to emit sounds through the second acoustic opening in response to that the rotation angle of the first body relative to the second body equals the second threshold.

* * * * *